(12) United States Patent
Zhang et al.

(10) Patent No.: US 11,478,935 B2
(45) Date of Patent: Oct. 25, 2022

(54) METHOD FOR ROBOT TO AUTOMATICALLY FIND BENDING POSITION

(71) Applicant: NANJING ESTUN ROBOTICS CO., LTD, Nanjing (CN)

(72) Inventors: Jinbao Zhang, Nanjing (CN); Lin Zhou, Nanjing (CN); Shuyi Jing, Nanjing (CN); Xiaobo Chi, Nanjing (CN); Jiegao Wang, Nanjing (CN)

(73) Assignee: NANJING ESTUN ROBOTICS CO., LTD, Nanjing (CN)

( * ) Notice: Subject to any disclaimer, the term of this patent is extended or adjusted under 35 U.S.C. 154(b) by 928 days.

(21) Appl. No.: 16/314,651

(22) PCT Filed: Dec. 14, 2017

(86) PCT No.: PCT/CN2017/116111
§ 371 (c)(1),
(2) Date: Dec. 31, 2018

(87) PCT Pub. No.: WO2018/137431
PCT Pub. Date: Aug. 2, 2018

(65) Prior Publication Data
US 2019/0240838 A1    Aug. 8, 2019

(30) Foreign Application Priority Data
Aug. 8, 2017 (CN) .......................... 201710669128.0

(51) Int. Cl.
G05B 15/00    (2006.01)
G05B 19/00    (2006.01)
(Continued)

(52) U.S. Cl.
CPC ............ B25J 9/1694 (2013.01); B21D 5/002 (2013.01); B21D 5/004 (2013.01); B21D 43/11 (2013.01);
(Continued)

(58) Field of Classification Search
CPC . G05B 2219/40054; G05B 2219/40421; B25J 15/08; B25J 9/1679; B25J 9/1694; B21D 43/11; B21D 5/002; B21D 5/004
See application file for complete search history.

(56) References Cited

U.S. PATENT DOCUMENTS 5,053,976 A * 10/1991 Nose ...................... B25J 9/1607
901/3
2013/0108401 A1 * 5/2013 Schaller ............ H01L 21/67213
414/217
(Continued)

Primary Examiner — Harry Y Oh
(74) Attorney, Agent, or Firm — PROI Intellectual Property US; Klaus Michael Schmid

(57) ABSTRACT

A method for a robot to automatically find a bending position, including the following steps: step 1, establishing a gripper tool coordinate system (TX, TY, TZ); step 2, determining a user coordinate system ($X_A$, $Y_A$, $Z_A$; $X_B$, $Y_B$, $Z_B$) of rear blocking fingers (11, 21); step 3, a robot gripper moving horizontally, and detecting the state of sensors (12, 22); step 4, the robot gripper executing a rotational movement, detecting the state of the sensors (12, 22), and thereby obtaining a standard bending position. The robot automatically finds the bending position, the teaching difficulty is reduced, and the bending quality is increased. In the elevator industry, elevator door plate bending sizes are the same, but forming sizes are different. In the present invention, only one product process needs to be taught in order to satisfy elevator door plate processing with different specifications, thereby reducing maintenance costs and increasing production efficiency.

1 Claim, 4 Drawing Sheets

(51) Int. Cl.
*B25J 9/16* (2006.01)
*B21D 5/00* (2006.01)
*B25J 15/08* (2006.01)
*B21D 43/11* (2006.01)

(52) U.S. Cl.
CPC .............. *B25J 9/1679* (2013.01); *B25J 15/08* (2013.01); *G05B 2219/40054* (2013.01); *G05B 2219/40421* (2013.01)

(56) References Cited

U.S. PATENT DOCUMENTS

2016/0214255 A1* 7/2016 Uhlenbrock .......... B25J 9/1697
2018/0353245 A1* 12/2018 Mccloud ................ A61B 34/76

* cited by examiner

METHOD FOR ROBOT TO AUTOMATICALLY FIND BENDING POSITION

FIELD OF THE INVENTION

The invention relates to a method for sheet metal bending by a robot, and particularly to a method for automatically finding a bending position by a robot.

BACKGROUND OF THE INVENTION

With the acceleration of Chinese economic development, in response to the call of Made in China 2025, more and more enterprises optimize their productivity using robots instead of labor so as to ensure the production quality and improve the production efficiency. Robots have also entered the traditional sheet metal processing industry, including robot transportation, bending, plate shearing and so on. However, robots seem to encounter great challenges in the bending processing industry. It is well known that robots mostly employ teaching reproduction, while the characteristics of a large variety of products, high machining precision, great difficulty in teaching and the like in the bending processing industry hinder robots from rapid development in the bending industry.

Chinese Invention Patent Document entitled "Method and Device for Correcting Bent Feeding Pose of Robot" (patent application number: 201410559512.1) discloses the related art, wherein, in the method, information is acquired from a position detection device and a rotation matrix and a translation matrix are converted to obtain a standard bending position, and the method can ensure the bending quality to a certain extent, but due to greater difficulty in teaching, especially when there are a larger variety of products, it is necessary to re-teach the position according to different sheet materials, otherwise information cannot be acquired from the position detection device, and therefore a standard bending position cannot be calculated.

SUMMARY OF THE INVENTION

An object of the invention is to overcome the defects of the prior art, and provide a method for automatically finding a bending position by a robot, which can improve the bending quality, reduce the difficulty in teaching, reduce the maintenance cost and improve the production efficiency.

To achieve the object of the invention, a method for automatically finding a bending position by a robot provided by the invention comprises the steps of:

step 1: establishing a tool coordinate system (TX, TY, TZ) of a robot gripper, wherein the robot gripper is mounted on an end flange and connected by means of screwing, the TZ direction is a normal vector at an end of the flange of the robot and its positive direction is the lead-out direction of the flange, the TX direction is the same as the X direction of the robot, the TY direction is determined according to the right-hand rule, and the origin O of the coordinate system is an intersection point between the center of the flange in the TZ direction and the plane of a workpiece to be grabbed; and translating a TCP (tool center position) of the robot from the center of the flange to the newly established tool coordinate system;

step 2: determining respective user coordinate systems $(X_A, Y_A, Z_A; X_B, Y_B, Z_B)$ of two rear retaining fingers (wherein the rear retaining fingers are sheet positioning devices of a bending machine):

wherein the X axis is parallel to a center line M of a lower mold of the bending machine, the Z axis is parallel to the moving direction of an upper mold of the bending machine, the positive direction of the Z axis is the same as the downward moving direction of an upper slider, the Y axis is perpendicular to the X axis, the positive direction of the Y axis is a direction in which the rear retaining finger points to the lower mold of the bending machine, and an intersection point between a center line of the rear retaining finger and an edge of the lower mold is the origin O of the user coordinate system of the rear retaining finger;

step 3: selecting the user coordinate system of one rear retaining finger, and calculating a correction translation matrix of the robot along the X direction in the user coordinate system (wherein the two user coordinate systems have the same X direction, and therefore have the same correction translation matrix in the X direction), thus the correction translation matrix T can be calculated by the following formula:

$$T = \begin{bmatrix} 1 & 0 & 0 & p_x \\ 0 & 1 & 0 & 0 \\ 0 & 0 & 1 & 0 \\ 0 & 0 & 0 & 1 \end{bmatrix},$$

where $p_x$ is the translation distance of the robot in the user coordinate system; and performing the translational motion of the robot gripper based on the correction translation matrix, acquiring the information of rear retaining finger sensors in real time during motion, stopping the translational motion of the robot gripper when one of the rear retaining finger sensors is detected, and recording the current position and posture of the robot; and step 4: judging the information state of the rear retaining finger sensors, calculating a rotation matrix of the robot gripper in the user coordinate system of the rear retaining finger whose rear retaining finger sensor information is detected, and performing rotary motion by the robot gripper around the origin of the user coordinate system of the rear retaining finger whose information is detected based on the correction rotation matrix:

if the information of the two rear retaining finger sensors is detected simultaneously, then the robot gripper is in a standard bending position; and if only the information of one rear retaining finger sensor is detected and the information of the other rear retaining finger sensor is not detected, calculating a correction rotation matrix of the robot in the user coordinate system of the rear retaining finger whose rear retaining finger sensor information is detected, performing the rotary motion of the robot gripper based on the correction rotation matrix, rotating the robot gripper around the origin of the user coordinate system of the rear retaining finger whose rear retaining finger sensor information is detected, and stopping the rotary motion of the robot gripper until the other sensor is detected; then the robot gripper is in a standard bending position.

When the robot gripper is in a standard bending position, the robot controls the action of the upper bending slider to complete sheet metal bending.

Each side of the workpiece to be bent grabbed by the robot is sequentially automatically found for a standard bending position according to the above steps 1 to 4, and the robot controls the action of the upper bending slider to complete tracked sheet metal bending.

The steps of the above method are indicated by numerals 1 to 4, but should not be regarded as limiting the sequence of the steps. Those skilled in the art clearly know that the sequence of the steps in the above method can be adjusted relative to each other according to the contents described in the description.

The invention has the following beneficial effects: 1) a method for automatically finding a bending position by a robot can simplify complicated teaching work, and the robot only needs to be roughly taught the position of a feeding point so as to automatically find a standard bending position using the method, thus improving the bending quality; and 2) for some products with the same bending size and different molding dimensions, robot programs can complete the processing of the products without any modification due to their universality, and considering the potential interference between the gripper and the machine tool, the search protection distance is set to increase safety, thus reducing the maintenance cost and improving the production efficiency.

DETAILED DESCRIPTION OF THE INVENTION

The invention will be further described in detail with reference to the drawings and embodiments.

Figure 1:
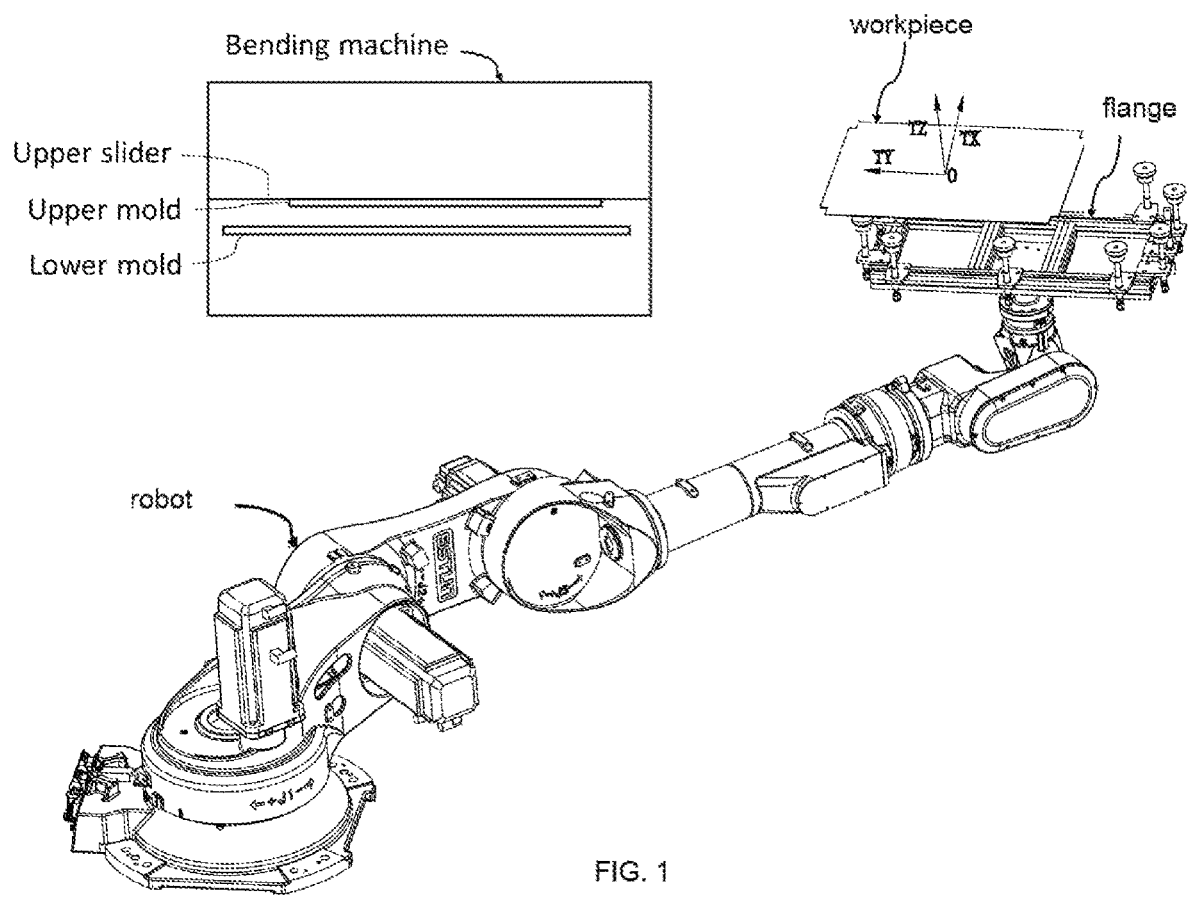
FIG. 1 shows establishing a tool coordinate system for a robot and offsetting a TCP of the robot from the center of a flange to the center of a gripper.
Figure 2:
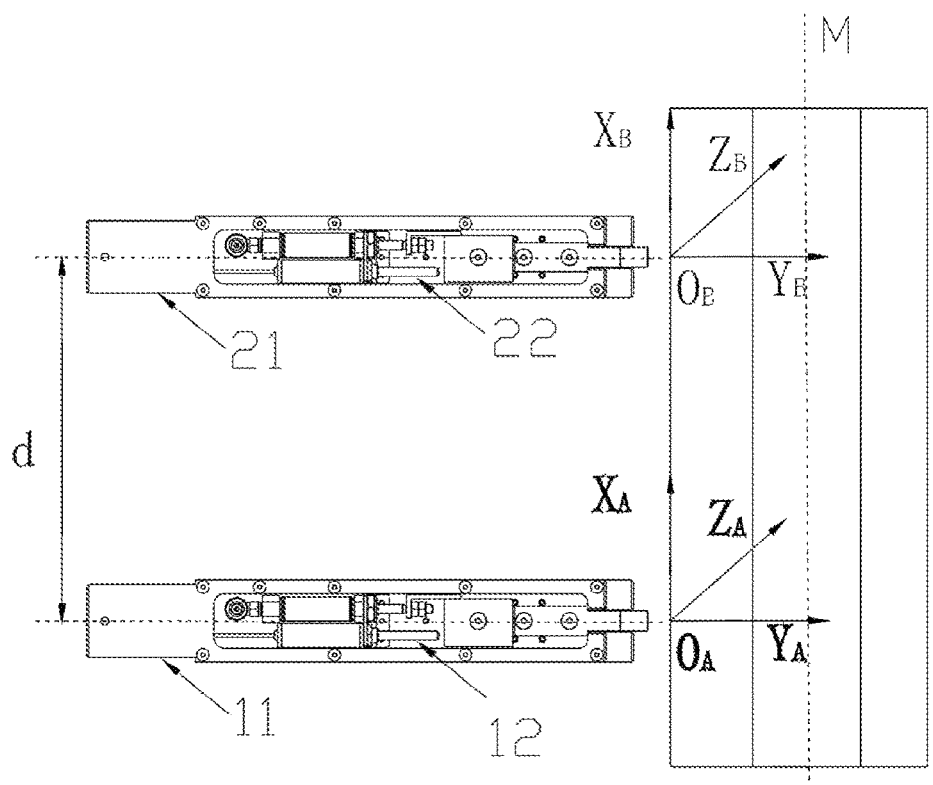
FIG. 2 shows establishing user coordinate systems of two rear retaining fingers for the robot.
Figure 3:
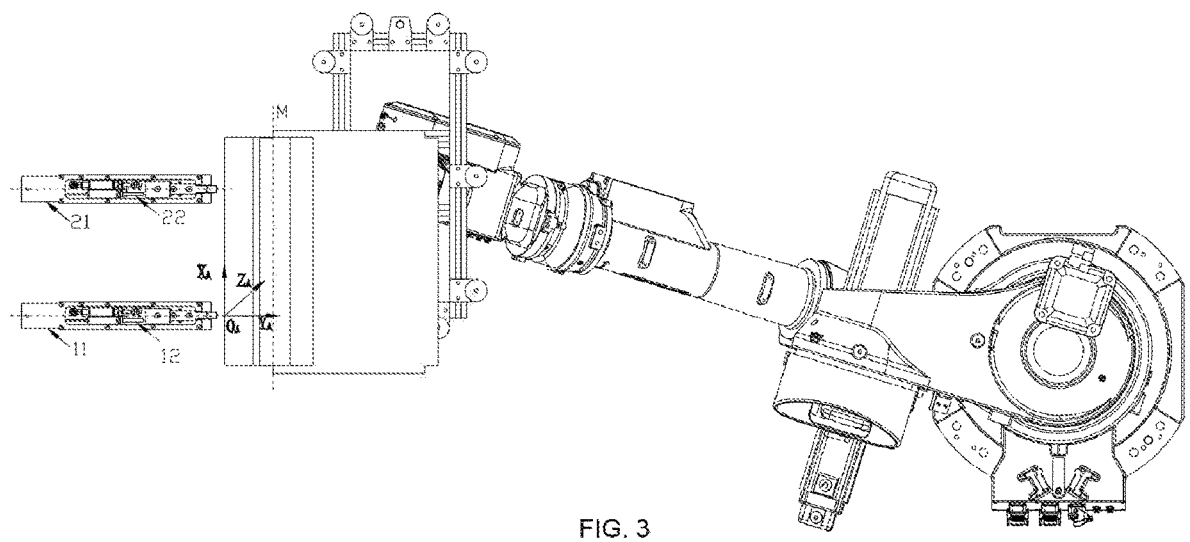
FIG. 3 shows the current posture of the robot gripper when a front point of a bending position is placed for the robot.
Figure 4:
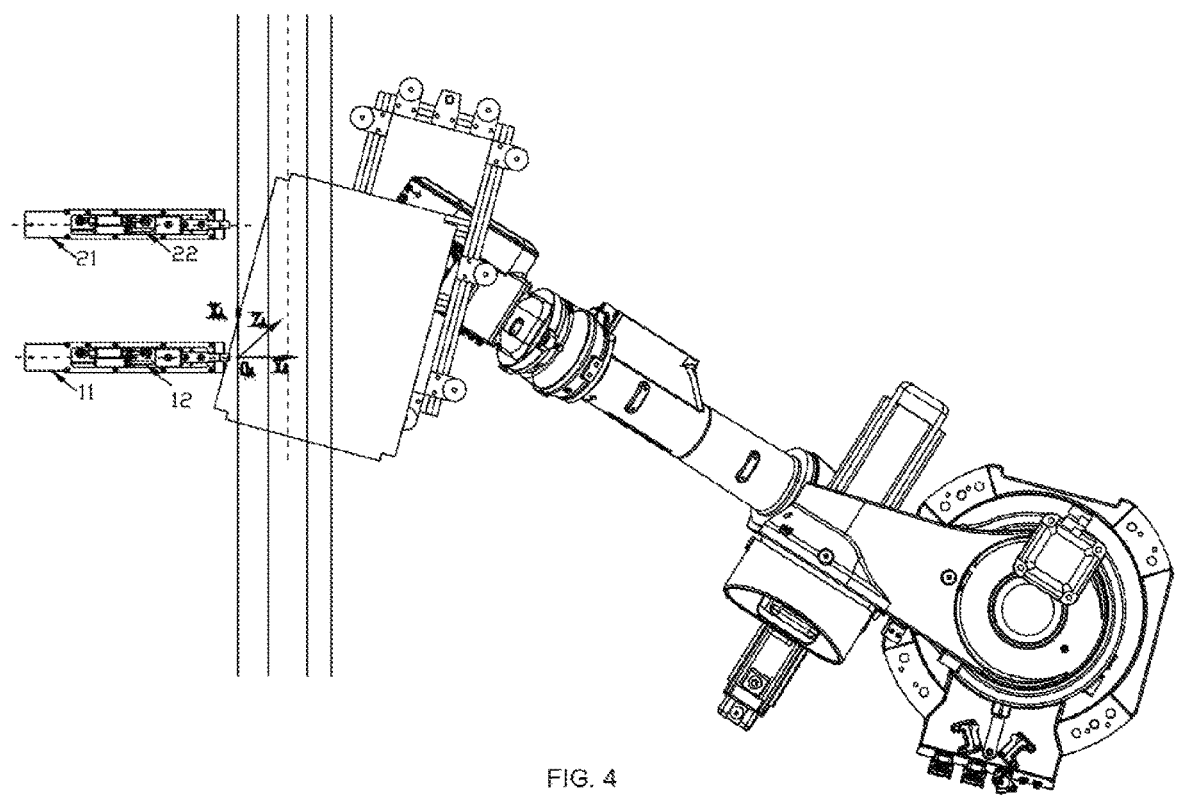
FIG. 4 shows the current posture of the robot upon detection of a rear retaining finger sensor 12 after the robot gripper executes a translation matrix along the Y direction of the user coordinate system A of one rear retaining finger.
Figure 5:
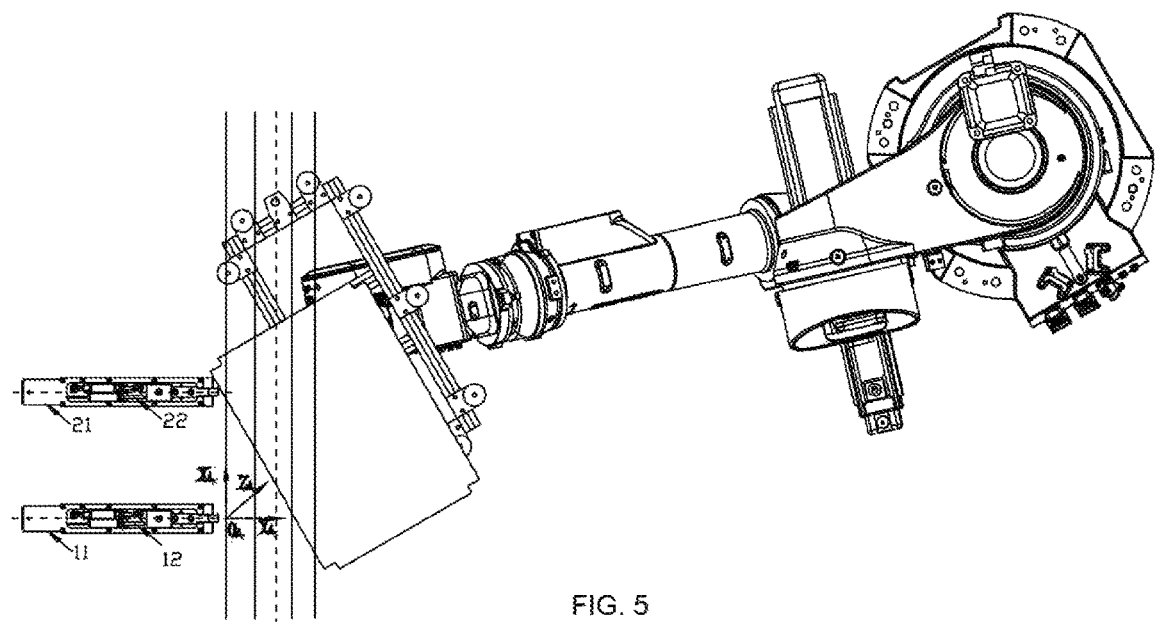
FIG. 5 shows the current posture of the robot upon detection of a rear retaining finger sensor 22 after the robot gripper executes a translation matrix along the Y direction of the user coordinate system A of one rear retaining finger.
Figure 6:
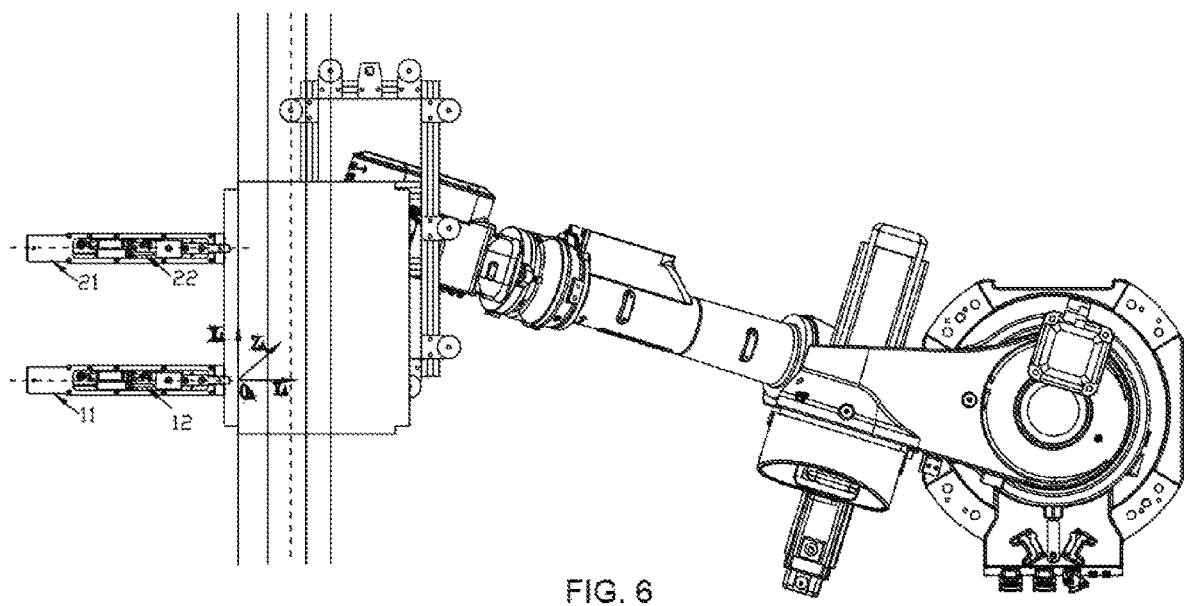
FIG. 6 shows the current posture of the robot upon simultaneous detection of the rear retaining finger sensor 22 and the rear retaining finger sensor 12 after the robot gripper executes a translation matrix along a direction of the user coordinate system A of one rear retaining finger.

A method for automatically finding a bending position by a robot according to the invention comprises the steps of:

step 1: referring to FIG. 1, establishing a tool coordinate system (TX, TY, TZ) of a robot gripper, wherein the TZ direction is a normal vector at an end of a flange of the robot and its positive direction is the lead-out direction of the flange, the TX direction is the same as the X direction of the robot, the TY direction is determined according to the right-hand rule, and the origin O of the coordinate system is an intersection point between the center of the flange in the TZ direction and the plane of a workpiece to be grabbed; and translating a TCP of the robot from the center of the flange to the newly established tool coordinate system;

step 2: determining respective user coordinate systems $(X_A, Y_A, Z_A)$ of two rear retaining fingers, wherein a center line M of a lower mold of a bending machine is in the $X_A$ direction, the positive direction of $X_A$ is the same as a direction in which the rear retaining finger 11 points to 21, the moving direction of an upper mold of the bending machine is the $Z_A$ direction and its positive direction is the same as the downward moving direction of an upper slider, the $Y_A$ direction is determined according to the right-hand rule, an intersection point between a center line of the rear retaining finger and an edge of the lower mold is the origin $O_A$ of the user coordinate system of the rear retaining finger 11, and the origin of the user coordinate system of the rear retaining finger 21 can be obtained by translating the spacing d between 11 and 21; and since the offset direction of the rear retaining finger 21 relative to the rear retaining finger 11 is the positive direction of $Y_A$, the user coordinate system of the rear retaining finger 21 relative to the rear retaining finger 11 can be calculated by the following formula: $T_{21}=T_{11}T$, where $T_{11}$ is the user coordinate system of the rear retaining finger 11 and $T_{21}$ is the user coordinate system of the rear retaining finger 21; and $$T = \begin{bmatrix} 1 & 0 & 0 & 0 \\ 0 & 1 & 0 & d \\ 0 & 0 & 1 & 0 \\ 0 & 0 & 0 & 1 \end{bmatrix}$$

is a translation matrix of the user coordinate system of the rear retaining finger 21 relative to the user coordinate system of the rear retaining finger 11;

step 3: calculating a correction translation matrix of the robot along the $X_A$ direction in the user coordinate system 11 (wherein the user coordinate system 11 and the user coordinate system 21 have the same $X_A$ direction, so the two user coordinate systems have the same correction translation matrix in the $X_A$ direction), thus the correction translation matrix T can be calculated by the following formula:

$$T = \begin{bmatrix} 1 & 0 & 0 & p_x \\ 0 & 1 & 0 & 0 \\ 0 & 0 & 1 & 0 \\ 0 & 0 & 0 & 1 \end{bmatrix},$$

where $p_x$ is the translation distance of the robot in the user coordinate system 11; and performing the translational motion of the robot gripper based on the correction translation matrix, acquiring the information of rear retaining finger sensors in real time during motion, stopping the translational motion of the robot gripper when one of the rear retaining finger sensors is detected, and recording the current position and posture of the robot; and step 4: FIGS. 4, 5 and 6 show the posture of the robot when sensor information is detected.

If the information of the left and right rear retaining finger sensors (12, 22) is detected simultaneously, then the robot gripper is in a standard bending position. The robot controls the action of the upper bending slider to complete sheet metal bending.

If the information of the rear retaining finger sensor 12 is detected and the information of the rear retaining finger sensor 22 is not detected, a correction rotation matrix of the robot in the user coordinate system 11 is calculated:

$$T\begin{bmatrix} R_\theta & 0 \\ 0 & 1 \end{bmatrix},$$

where $R_\theta$ is a 3×3 matrix related to an angle $\theta$. $\theta$ is the search step size, which is a fixed angle $0<\theta\leq 45°$.

$$R_\theta = \begin{bmatrix} c\theta & s\theta & 0 \\ -s\theta & c\theta & 0 \\ 0 & 0 & 1 \end{bmatrix},$$

where $c\theta$ denotes $\cos(\theta)$ and $s\theta$ denotes $\sin(\theta)$.

The robot gripper is rotated (rotated by the angle $\theta$ each time) around the origin of the user coordinate system of the rear retaining finger based on the correction rotation matrix, and the rotary motion of the robot gripper is stopped until the other rear retaining finger sensor 22 is detected. The robot controls the action of the upper bending slider to complete sheet metal bending.

If the information of the rear retaining finger sensor 12 is not detected and the information of the rear retaining finger sensor 22 is detected, a correction rotation matrix of the robot in the user coordinate system 21 is calculated by the same method as described above based on the correction rotation matrix:

$$T\begin{bmatrix} R_\theta & 0 \\ 0 & 1 \end{bmatrix},$$

where $R_\theta$ is a 3×3 matrix related to an angle $\theta$. $\theta$ is the search step size, which is a fixed angle $-45°\leq\theta<0$.

$$R_\theta = \begin{bmatrix} c\theta & s\theta & 0 \\ -s\theta & c\theta & 0 \\ 0 & 0 & 1 \end{bmatrix},$$

where $c\theta$ denotes $\cos(\theta)$ and $s\theta$ denotes $\sin(\theta)$.

The robot gripper is rotated around the origin of the user coordinate system of the rear retaining finger based on the correction rotation matrix, and the rotary motion of the robot gripper is stopped until the other rear retaining finger sensor 12 is detected. The robot controls the action of the upper bending slider to complete sheet metal bending.

Figure 7:
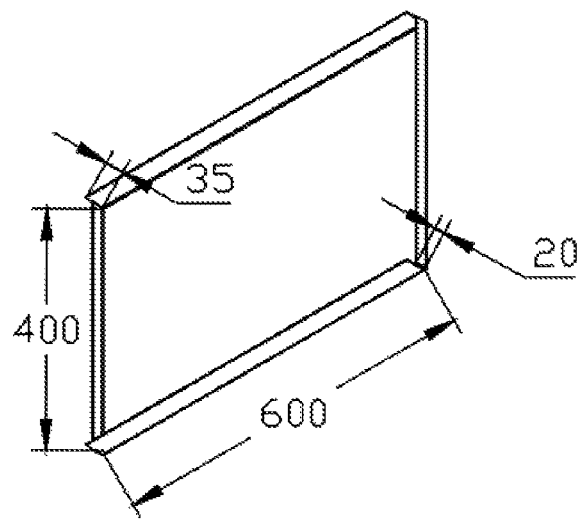
FIG. 7 shows a bent product of an elevator door panel completed by the robot using a method for automatically finding a bending position.

In this embodiment, the workpiece to be bent is an elevator door panel which has totally four sides to be bent, each of the sides is automatically found for a standard bending position according to the above steps 1 to 5, and the robot controls the action of the upper bending slider to complete tracked bending, thus obtaining a product as shown in FIG. 7.

What is claimed is:

1. A method for automatically finding a bending position by a robot, comprising the steps of:

step 1: establishing a tool coordinate system of a robot gripper, the tool coordinate system having an origin O of the tool coordinate system, a TX axis pointing in a TX direction, a TY axis pointing in a TY direction and a TZ axis pointing in a TZ direction, wherein the TZ axis is a normal vector at an end of a flange of the robot and its positive direction points away from the flange, the TX direction is at a right angle to the TZ axis and points in direction of the robot towards a bending machine, the TY direction is determined according to the right-hand rule with respect to the origin O of the tool coordinate system, and the origin O of the tool coordinate system is an intersection point between a center of the flange in the TZ direction and the plane of a workpiece to be grabbed; and translating a Tool Center Position, TCP, of the robot from the center of the flange in the TZ direction to the newly established tool coordinate system;

step 2: determining respective user coordinate systems of two rear retaining fingers, each user coordinate system having an X axis, a Y axis, a Z axis and an origin O of the user coordinate system:

wherein for each rear retaining finger and its coordinate system the X axis is parallel to a center line M of a lower mold of the bending machine, the Z axis is parallel to a moving direction of an upper mold of the bending machine, the positive direction of the Z axis points in direction of a downward moving direction of an upper slider of the bending machine, the Y axis is perpendicular to the X axis, the positive direction of the Y axis is a direction in which the rear retaining finger points to the lower mold of the bending machine, and an intersection point between a center line of the rear retaining finger and an edge of the lower mold is the origin O of the user coordinate system of the rear retaining finger;

step 3: selecting the user coordinate system of one of the two rear retaining fingers, and calculating a correction translation matrix of the robot along the X direction in the user coordinate system:

$$T = \begin{bmatrix} 1 & 0 & 0 & p_x \\ 0 & 1 & 0 & 0 \\ 0 & 0 & 1 & 0 \\ 0 & 0 & 0 & 1 \end{bmatrix},$$

where $p_x$ is the translation distance of the robot in the user coordinate system; and performing the translational motion of the robot gripper based on the correction translation matrix, acquiring regarding the selected user coordinate system and its rear retaining finger information of a rear retaining finger sensor in real time during motion, stopping the translational motion of the robot gripper when the rear retaining finger sensor detects contact with the robot, and recording the current position and posture of the robot; and step 4: judging the information state of the rear retaining finger sensor, calculating a rotation matrix of the robot gripper in the user coordinate system of the rear retaining finger whose rear retaining finger sensor information is detected, and performing rotary motion by the robot gripper around the origin of the user coordinate system of the rear retaining finger whose information is detected based on the correction rotation matrix:

if the information of the two rear retaining finger sensors is detected simultaneously, then the robot gripper is in a standard bending position; and if only the information of one rear retaining finger sensor is detected and the information of the other retaining finger sensor is not detected, calculating a correction rotation matrix of the robot in the user coordinate system of the rear retaining finger whose rear retaining finger sensor information is detected, performing the rotary motion of the robot gripper based on the correction rotation matrix, rotating the robot gripper around the origin of the user coordinate system of the rear retaining finger whose rear retaining finger sensor information is detected, and stopping the rotary motion of the robot gripper until the other sensor is detected; then the robot gripper is in a standard bending position.

* * * * *